(12) United States Patent
Kim et al.

(10) Patent No.: US 9,902,796 B2
(45) Date of Patent: Feb. 27, 2018

(54) CORE-SHELL STRUCTURED POLYMER PARTICLES AND RUBBER COMPOSITION INCLUDING THE SAME

(71) Applicant: LG Chem, Ltd., Seoul (KR)

(72) Inventors: Yoon Ho Kim, Daejeon (KR); Geon Soo Kim, Daejeon (KR); Sang Il Nam, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/895,428

(22) PCT Filed: May 19, 2015

(86) PCT No.: PCT/KR2015/005003
§ 371 (c)(1),
(2) Date: Dec. 2, 2015

(87) PCT Pub. No.: WO2015/186917
PCT Pub. Date: Dec. 10, 2015

(65) Prior Publication Data
US 2016/0194427 A1    Jul. 7, 2016

(30) Foreign Application Priority Data
Jun. 3, 2014 (KR) ........................ 10-2014-0067726

(51) Int. Cl.
| | |
|---|---|
| *C08J 3/12* | (2006.01) |
| *C08L 21/00* | (2006.01) |
| *C08L 21/02* | (2006.01) |
| *C08L 51/00* | (2006.01) |
| *C08F 279/02* | (2006.01) |
| *C08L 9/06* | (2006.01) |

(52) U.S. Cl.
CPC .............. *C08F 279/02* (2013.01); *C08L 9/06* (2013.01); *C08L 21/00* (2013.01); *C08L 21/02* (2013.01); *C08L 51/00* (2013.01); *C08L 2207/53* (2013.01); *Y02T 10/862* (2013.01)

(58) Field of Classification Search
CPC .......... C08F 279/02; C08J 3/12; C08L 21/00; C08L 21/02; C08L 51/00; C08L 9/06; C08L 2207/53
See application file for complete search history.

(56) References Cited

U.S. PATENT DOCUMENTS

| | | | |
|---|---|---|---|
| 5,461,125 A | 10/1995 | Lu et al. | |
| 5,708,093 A | 1/1998 | Bastelberger et al. | |
| 6,127,488 A * | 10/2000 | Obrecht | C08L 7/02 152/209.1 |
| 7,915,327 B2 | 3/2011 | Keoshkerian et al. | |
| 2008/0233509 A1 | 9/2008 | Keoshkerian et al. | |
| 2011/0224351 A1* | 9/2011 | Mori | B60C 1/0016 524/458 |
| 2012/0041129 A1 | 2/2012 | Steinhauser et al. | |

FOREIGN PATENT DOCUMENTS

| | | |
|---|---|---|
| CN | 100381484 C | 4/2008 |
| JP | 2729533 B2 | 3/1998 |
| JP | H10204217 A | 8/1998 |
| JP | 2004359714 A | 12/2004 |
| JP | 2006225462 A | 8/2006 |
| JP | 2012515824 A | 7/2012 |
| KR | 10-0337054 B1 | 11/2002 |
| KR | 10-0533938 B1 | 12/2005 |
| WO | 2010038835 A1 | 4/2010 |

OTHER PUBLICATIONS

International Search Report for Application No. PCT/KR2015/005003 dated Aug. 21, 2015.

* cited by examiner

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP

(57) ABSTRACT

Provided are core-shell structured polymer particles capable of enhancing abrasion resistance, rolling resistance and wet slip resistance of rubber while improving mechanical properties such as tensile strength and tensile elongation, a rubber composition including the same, and a molded rubber article, for example, a tire, prepared therefrom. Such core-shell structured polymer particles are capable of enhancing abrasion resistance (lifespan property), rolling resistance (fuel efficiency performance) and wet slip resistance (brake performance) while providing excellent mechanical properties to rubber.
Accordingly, the molded rubber article, for example, a tire, prepared from the rubber composition including the core-shell structured polymer particles is capable having an excellent lifespan property, fuel efficiency performance and brake performance while exhibiting excellent mechanical properties.

13 Claims, No Drawings

CORE-SHELL STRUCTURED POLYMER PARTICLES AND RUBBER COMPOSITION INCLUDING THE SAME

CROSS-REFERENCE TO RELATED APPLICATION

The present application is a national phase entry under 35 U.S.C. § 371 of International Application No. PCT/KR2015/005003, filed May 19, 2015, which claims priority from Korean Application No. 10-2014-0067726, filed Jun. 3, 2014, all of which are incorporated herein by reference.

FIELD OF THE INVENTION

The present invention relates to core-shell structured polymer particles capable of enhancing abrasion resistance, rolling resistance and wet slip resistance of rubber while improving mechanical properties such as tensile strength and tensile elongation, a rubber composition including the same, and a molded rubber article, for example, a tire, prepared therefrom.

DESCRIPTION OF THE RELATED ART

Rubber is widely used in various fields due to its unique viscoelastic properties, and recently, rubber exhibiting specific properties is manufactured using various additives and used in order to obtain better properties depending on use.

Particularly in a tire industry, rubber is an essential material used for manufacturing tires, and various components and parts forming a tire are made of rubber, and accordingly, tire performance is largely affected by properties of rubber.

Tires require various properties, and particularly an important property among these is excellent adhesion for dry and wet surfaces. In other words, having a proper balance between slip resistance, rolling resistance and abrasivity is important. However, improving slip resistance of a tire without damaging rolling resistance and abrasivity is very difficult. Herein, slip resistance is important for brake performance, rolling resistance is important for fuel efficiency, and abrasion resistance is a crucial factor for a lifespan of a tire.

Generally, slip resistance (brake performance) and rolling resistance (fuel efficiency performance) of a tire largely varies depending on viscoelastic properties of rubber used in the manufacture of the tire. Among the viscoelastic properties, a dynamic loss coefficient (tan $\delta$) at 0° C. is closely related to wet slip resistance (brake performance on a wet road), and a dynamic loss coefficient at 60° C. is closely related to rolling resistance (fuel efficiency performance). Specifically, rubber used for tires (particularly, treads) needs to have high repulsive elasticity at a relatively high temperature (60° C. to 100° C.) in order to lower rolling resistance, and in order to improve wet slip resistance, rubber used for tires needs to have low repulsive elasticity in a temperature range of 0° C. to 23° C. while having a high attenuation factor at a low temperature (0° C.)

Accordingly, it can be seen that, when using a dynamic loss coefficient at 0° C. as a substitute for wet slip resistance (brake performance), and a dynamic loss coefficient at 60° C. as a substitute for rolling resistance (fuel efficiency performance), brake performance and fuel efficiency performance are both satisfied when the dynamic loss coefficient at 0° C. is large, and the dynamic loss coefficient at 60° C. is small.

In order to meet such a complex required profile, mixtures formed with various types of rubber are used for tires. A common method is using a mixture formed with one or more types of rubber having a relatively high glass transition temperature (for example, styrene-butadiene rubber) and one or more types of rubber having a relatively low glass transition temperature (for example, polybutadiene having high 1,4-cis content), or styrene-butadiene rubber each having low styrene content and very low vinyl content, or polybutadiene having low vinyl content and prepared in a solution.

However, the rubber mixture is not sufficient to satisfy all properties of slip resistance (brake performance), rolling resistance (fuel efficiency performance) and abrasion resistance (lifespan of tire), and as a result, a method mixing silica to a rubber material as a filler has been researched and developed.

However, silica itself has functional groups overly focused on the surface and thereby has high acidity, and exhibits high filler-filler reactivity and relatively low filler-rubber reactivity, therefore, has various problems in that special processing conditions are required, and a great quantity of coupling agents are required in order to obtain an ideal curing property, and accordingly, has not been widely used. As a result, efforts to solve such problems have been made in many different fields.

In view of the above, the inventors of the present invention have studied rubber having improved abrasion resistance (lifespan property), rolling resistance (fuel efficiency performance) and wet slip resistance (brake performance) while having excellent mechanical properties such as tensile strength and tensile elongation, and capable of being readily used as a tire material in various industries that need rubber, particularly, a tire industry In the process, the inventors of the present invention have prepared core-shell structured polymer particles grafted with a shell including a vinyl compound and an alkoxysilane derivative compound on a diene-based latex core, and analyzed properties of a rubber specimen including the particles, and as a result, have identified that the specimen has enhanced abrasion resistance, Payne effect, rolling resistance and wet slip resistance while having excellent tensile strength, tensile elongation and specific gravity properties, and have completed the present invention.

DISCLOSURE OF THE INVENTION

Technical Problem

An aspect of the present invention is directed to providing core-shell structured polymer particles capable of enhancing abrasion resistance (lifespan property), rolling resistance (fuel efficiency performance) and wet slip resistance (brake performance) of rubber while improving properties such as specific gravity, tensile strength and tensile elongation.

Another aspect of the present invention is directed to providing a rubber composition including the core-shell structured polymer particles.

Still another aspect of the present invention is directed to providing a molded rubber article prepared from the rubber composition.

Technical Solution

In view of the above, one embodiment of the present invention provides core-shell structured polymer particles including 40% by weight to 80% by weight of a diene-based latex core; and 20% by weight to 60% by weight of a graft shell including a vinyl compound and an alkoxysilane derivative compound formed on the core, wherein the graft shell includes 60% by weight to 90% by weight of the vinyl compound and 10% by weight to 40% by weight of the alkoxysilane derivative compound.

Another aspect of the present invention provides a rubber composition including 100 parts by weight of rubber; and 20 parts by weight to 80 parts by weight of the core-shell structured polymer particles with respect to 100 parts by weight of the rubber.

Still another aspect of the present invention provides a molded rubber article prepared from the rubber composition.

Advantageous Effects

The core-shell structured polymer particles according to the present invention are effective in enhancing abrasion resistance, a Payne effect, rolling resistance (fuel efficiency performance) and wet slip resistance (brake performance) of rubber while improving specific gravity, tensile strength and tensile elongation properties by grafting a shell including an alkoxysilane derivative compound on a diene-based latex core.

Accordingly, a molded rubber article, for example, a tire, prepared from a rubber composition including the core-shell structured polymer particles is capable having excellent fuel efficiency performance, brake performance and a lifespan property while exhibiting excellent mechanical properties, and therefore, may be readily used in industries requiring the molded rubber article.

MODE FOR CARRYING OUT THE INVENTION

Hereinafter, the present invention will be described in more detail in order to illuminate the present invention.

Terms or words used in the present specification and the claims are not to be interpreted limitedly as common or dictionary definitions, and shall be interpreted as meanings and concepts corresponding to technological ideas of the present invention based on a principle in which the inventors may suitably define the concepts of terms in order to describe the invention in the best possible way.

The present invention provides core-shell structured polymer particles capable of enhancing abrasion resistance (lifespan property), rolling resistance (fuel efficiency performance) and wet slip resistance (brake performance) of rubber while improving specific gravity, tensile strength and tensile elongation.

Rubber is widely used in various fields due to its unique viscoelastic properties. Particularly, it is a material used for whole tires, and is known to be an important factor determining tire performance such as slip resistance (brake performance), rolling resistance (fuel efficiency performance) and abrasion resistance (lifespan property).

Brake performance and fuel efficiency performance of tires generally have a high correlation with viscoelastic properties of rubber, and among the viscoelastic properties, a dynamic loss coefficient at 0° C. is closely related to brake performance on a wet road (wet slip resistance), and a dynamic loss coefficient at 60° C. is closely related to rolling resistance, that is, fuel efficiency performance. Brake performance is known to be favorable as a dynamic loss coefficient at 0° C. increases, and fuel efficiency performance is known to be favorable as a dynamic loss coefficient at 60° C. decreases. However, brake performance of a tire declines when reducing friction between a tire and a road in order to improve fuel efficiency performance. Accordingly, in order to both satisfy brake performance and fuel efficiency performance, methods using a mixture formed with various types of rubber as a tire (for example, tire tread), or mixing silica to a rubber mixture have been researched and developed.

However, silica itself has functional groups overly focused on the surface and thereby has high acidity, and exhibits high filler-filler reactivity and relatively low filler-rubber reactivity, therefore, has problems in that special processing conditions are required and at the same time, a great quantity of coupling agents are required in order to obtain an ideal curing property. In addition, silica has many problems in that silica is difficult to be dispersed since it scatters when mixed with a polymer due to specific gravity of the silica material itself, and as a curing property, has poor abrasivity, and as a result, silica has not been widely used.

In view of the above, the present invention provides core-shell structured polymer particles including a diene-based latex core, and a graft shell including a vinyl compound and an alkoxysilane derivative compound formed on the core, and, when used as a filler for rubber, particularly, a filler of rubber for manufacturing a tire, capable of enhancing abrasion resistance, rolling resistance and wet slip resistance of the tire while improving specific gravity, tensile strength and tensile elongation.

The core-shell structured polymer particles according to one embodiment of the present invention includes 40% by weight to 80% by weight of a diene-based latex core; and 20% by weight to 60% by weight of a graft shell including a vinyl compound and an alkoxysilane derivative compound formed on the core, and the graft shell includes 60% by weight to 90% by weight of the vinyl compound and 10% by weight to 40% by weight of the alkoxysilane derivative compound.

The core-shell structured polymer particles may have an average particle diameter of 30 nm to 100 nm.

The diene-based latex core according to one embodiment of the present invention may be a polymer derived from a monomer mixture including 25% by weight to 55% by weight of a conjugated diene-based monomer; 25% by weight to 55% by weight of an ethylene unsaturated aromatic monomer; and 10% by weight to 30% by weight of a cross-linking agent.

In addition, the diene-based latex core may include the conjugated diene-based monomer and the ethylene unsaturated aromatic monomer in a weight ratio of 7:3 to 3:7, and preferably in a weight ratio of 3:5 to 5:3.

The conjugated diene-based monomer may perform a role of lowering a glass transition temperature of the core-shell structured polymer particles, that is, may act as a material providing excellent cold resistance, and may be one or more selected from the group consisting of butadiene, isoprene, chloroprene and piperylene. Preferably, butadiene may be used.

The conjugated diene-based monomer may be included in the diene-based latex core in 25% by weight to 55% by weight as described above. When the conjugated diene-based monomer is included in less than 25% by weight, a glass transition temperature of the core-shell structured polymer particles including the conjugated diene-based monomer may increase, and as a result, cold resistance of a rubber composition including the particles may decline.

The ethylene unsaturated aromatic monomer may perform a adjusting role so that a glass transition temperature of the core-shell structured polymer particles has a proper value without an excessive decrease, and may be one or more selected from the group consisting of styrene, α-methylstyrene, isopropylphenyl naphthalene, vinyl naphthalene, $C_{1-3}$ alkyl group-substituted alkylstyrene and halogen-substituted styrene. Preferably, styrene may be used.

As described above, the ethylene unsaturated aromatic monomer may be included in the diene-based latex core in % by weight to 55% by weight. When the ethylene unsaturated aromatic monomer is included in greater than 45% by weight, the conjugated diene-based monomer content relatively decreases causing a problem of a glass transition temperature increase.

The cross-linking agent may perform a role of adjusting the degree of cross-linking of the diene-based latex core, and may use one or more selected from the group consisting of divinylbenzene, ethylene glycol dimethacrylate, diethylene glycol dimethacrylate, triethylene glycol dimethacrylate, 1,3-butylene glycol dimethacrylate, aryl methacrylate and 1,3-butylene glycol diacrylate. Preferably, divinylbenzene may be used.

As described above, the cross-linking agent may be included in the diene-based latex core in 10% by weight to 30% by weight.

The diene-based latex core according to the present invention may be included in the core-shell structured polymer particles in 40% by weight to 80% by weight as described above. When the diene-based latex core is included in less than 40% by weight, wet slip resistance of a molded rubber article, for example, a tire, prepared from a rubber composition including the diene-based latex core may decline.

The graft shell including a vinyl compound and an alkoxysilane derivative compound according to one embodiment of the present invention may be formed surrounding the diene-based latex core, and may include 60% by weight to 90% by weight of the vinyl compound and 10% by weight to 40% by weight of the alkoxysilane derivative compound.

The vinyl compound may be one or more selected from the group consisting of styrene, α-methylstyrene, isopropylphenyl naphthalene, vinyl naphthalene, $C_{1-3}$ alkyl group-substituted alkylstyrene, halogen-substituted styrene, alkyl (meth)acrylate, (meth)acrylic acid ester containing a hydroxyl group or alkoxy group, a cyanated vinyl compound, (meth)acrylic acid and a maleimide-based compound, and may preferably be alkyl methacrylate. More preferably, methyl methacrylate may be used.

The alkoxysilane derivative compound may be one or more selected from the group consisting of trimethoxysilylpropyl methacrylate, trimethoxysilylpropyl acrylate and trimethoxysilylethylstyrene, and may preferably be trimethoxysilylpropyl methacrylate.

Meanwhile, the core-shell structured polymer particles according to one embodiment of the present invention are not particularly limited, and to be used, may be prepared using methods commonly known in the art, or commercially available materials may be purchased.

For example, when the core-shell structured polymer particles are prepared to be used, the core-shell structured polymer particles may be prepared through preparing a diene-based latex core, and then graft copolymerizing a shell including a vinyl compound and an alkoxysilane derivative compound to the prepared diene-based latex core.

Specifically, the diene-based latex core is not particularly limited and may be prepared using common methods in the art, and for example, may be prepared by introducing additives such as ion-exchange water, an emulsifying agent, a polymerization initiator, an electrolyte and a molecular weight modifier to a conjugated diene-based monomer, an ethylene unsaturated aromatic monomer and a cross-linking agent, and then emulsion polymerizing the result.

The emulsion polymerization is not particularly limited and may be carried out using methods commonly known in the art, and for example, may be carried out by introducing additives such as ion-exchange water, an emulsifying agent, a polymerization initiator, an electrolyte and a molecular weight modifier at once to a monomer mixture including a conjugated diene-based monomer, an ethylene unsaturated aromatic monomer and a cross-linking agent, and reacting the result, or reacting them while continuously adding the additives dividing by a polymerization conversion rate time.

Specifically, the emulsion polymerization may be carried out using a method including a step of introducing a monomer mixture including a conjugated diene-based monomer, an ethylene unsaturated aromatic monomer and a cross-linking agent, and, with respect to 100 parts by weight of the monomer mixture, 150 parts by weight to 300 parts by weight of ion-exchange water, 0.5 parts by weight to 4 parts by weight of an emulsifying agent, 0.1 parts by weight to 1.5 parts by weight of a polymerization initiator, 0.5 parts by weight to 2 parts by weight of an electrolyte, and 0.1 parts by weight to 1 parts by weight of a molecular weight modifier are introduced into a polymerization reactor at once, and reacting the result in a temperature range of 30° C. to 90° C. Herein, the monomer mixture and the cross-linking agent may be added together with additives such as the emulsifying agent and the polymerization initiator and then reacted, or may be introduced after initially filling the reactor with the additives, or may be added in installments over a few times or continuously added during the polymerization reaction.

The types and the content of the conjugated diene-based monomer, the ethylene unsaturated aromatic monomer and the cross-linking agent are as described above.

The polymerization initiator is not particularly limited, and for example, a water-soluble persulfate-based polymerization initiator such as potassium persulfate, sodium persulfate or ammonium persulfate, and a redox-based polymerization initiator having peroxides such as hydrogen peroxide, cumene hydroperoxide, diisopropylbenzene hydroperoxide, tertiary butyl hydroperoxide or para-menthane hydroperoxide as one component may be used either alone or as a mixture.

The molecular weight modifier is not particularly limited, and common materials such as mercaptans may be used, and for example, n-butyl mercaptan, n-octyl mercaptan, n-dodecyl mercaptan, t-dodecyl mercaptan and the like many be used.

The emulsifying agent is not particularly limited, and for example, one type, or a combination of two or more types selected from the group consisting of alkyl aryl sulfonate, alkali methyl alkyl sulfate, sulfonated alkyl ester, soap of fatty acids and alkali salts of rosin acid may be used.

The electrolyte is not particularly limited, and for example, one or more selected from the group consisting of potassium chloride, sodium chloride, potassium bicarbonate, sodium carbonate, potassium carbonate, potassium hydrogen sulfite, sodium hydrogen sulfite, potassium pyrophosphate, sodium pyrophosphate, potassium phosphate, sodium phosphate, monopotassium phosphate and monosodium phosphate.

The diene-based latex core may be prepared by further using additives such as a reaction medium, a reducing agent, a catalyst and a stabilizer as necessary in addition to the active components and the additives described above.

The graft shell including a vinyl compound and an alkoxysilane derivative compound may be formed on the diene-based latex core through introducing a vinyl compound and an alkoxysilane derivative compound, and additives such as an emulsifying agent, a polymerization initiator and a molecular weight modifier to the prepared diene-based latex core, and then graft copolymerizing the result. Herein, the graft shell is preferably formed surrounding an outer surface of the core.

Herein, the graft copolymerization is not particularly limited, and may be carried out using methods commonly known in the art, and for example, may be carried out under the same polymerization condition as in the emulsion polymerization described above.

The vinyl compound and the alkoxysilane derivative compound, and the additives such as the emulsifying agent, the polymerization initiator and the molecular weight modifier are the same as those described above.

The graft shell may be prepared by further using additives such as a reaction medium, a reducing agent, a catalyst and a stabilizer as necessary in addition to the active components and the additives described above.

The core-shell structured polymer particles according to the present invention may be prepared as particles in a powder state through aggregation. The aggregation is not particularly limited, and may be carried out using methods commonly known in the art, and in addition, an aggregating agent used for the aggregation is not particularly limited, and common materials may be used in ordinary content.

In addition, the present invention provides a rubber composition including the core-shell structured polymer particles.

The rubber composition according to one embodiment of the present invention includes 100 parts by weight of rubber; and 20 parts by weight to 80 parts by weight of the core-shell structured polymer particles with respect to 100 parts by weight of the rubber. When the core-shell structured polymer particles are included in less than 20 parts by weight, a molded rubber article, for example, a tire, prepared from the rubber composition including the particles may have insignificant effects in improving tensile strength and tensile elongation of the tire, and when included in greater than 80 parts by weight, abrasion resistance, rolling resistance and wet slip resistance of the tire may decline.

The rubber composition may be a mixture in which the core-shell structured polymer particles are dispersed into the rubber, and the mixture may have an aggregate form mixing and aggregating the core-shell structured polymer particles to the rubber emulsion, or have a form simply mixing the core-shell structured polymer particles to the rubber.

The rubber is not particularly limited, and may include, for example, one or more selected from the group consisting of diene-based rubber, styrene-butadiene-based rubber, natural rubber, isoprene-based rubber, nitrile rubber, urethane-based rubber, butyl-based rubber and a combination thereof.

The rubber composition may further include additives such as a filler such as carbon black and silica, a cross-linking agent, an antioxidant and a vulcanization accelerator commonly known in the art as necessary in addition to the active components described above.

Moreover, the present invention provides a molded rubber article prepared from the rubber composition.

The molded rubber article according to one embodiment of the present invention may be a tire, and preferably, a tire tread.

The molded rubber article, particularly, a tire, prepared from the rubber composition including the core-shell structured polymer particles according to the present invention may have improved abrasion resistance, rolling resistance and wet slip resistance while having improved specific gravity, tensile strength and tensile elongation.

Hereinafter, the present invention will be described in more detail with reference to the following examples and test examples. However, the following examples and test examples are for illustrate purposes only, and the scope of the present invention is not limited thereto.

Example 1

1) Preparation of Cross-Linked Styrene-Butadiene Latex Core

A 120 l high pressure polymerization container equipped with a stirrer was initially filled with 280 parts by weight of ion-exchange water, 0.3 parts by weight of a buffer solution, 3.6 parts by weight of sodium alkyl aryl naphthalene sulfonate, 0.0047 parts by weight of ethylenediamine tetrasodium acetate, 0.003 parts by weight of iron sulfate, 0.02 parts by weight of sodium formaldehyde sulfoxylate and 0.1 parts by weight of diisopropylbenzene hydroperoxide with respect to 100 parts by weight of a monomer mixture. The monomer mixture including 30% by weight of butadiene, 50% by weight of styrene and 20% by weight of divinylbenzene was introduced thereto, and the result was polymerized for 6 hours at 50° C. to prepare a cross-linked styrene-butadiene latex core having a particle size of 260 Å as a cross-linked diene-based latex core. The polymerization conversion rate of the prepared styrene-butadiene latex was 96%.

2) Preparation of Core-Shell Structured Polymer Particles

60% by weight (based on solid) of the cross-linked styrene-butadiene latex core prepared was introduced to a closed reactor, the reactor was filled with nitrogen, and 0.0094 parts by weight of ethylenediamine tetrasodium acetate, 0.006 parts by weight of iron sulfate and 0.04 parts by weight of sodium formaldehyde sulfoxylate were introduced thereto, and then 30% by weight of methyl methacrylate, 10% by weight of trimethoxysilylpropyl methacrylate and 1.0 parts by weight of sodium alkyl aryl naphthalene sulfonate, 30 parts by weight of ion-exchange water and 0.1 parts by weight of t-butyl hydroperoxide were continuously introduced thereto over 1 hour at 50° C. The result was further graft polymerized for 1 hour to form a graft shell on the cross-linked styrene-butadiene latex core, and as a result, core-shell structured polymer particles were prepared. Herein, the parts by weight is an amounts employing the total amount of the cross-linked styrene-butadiene latex core, the methyl methacrylate and the trimethoxysilylpropyl methacrylate as 100 parts by weight.

Core-shell structured polymer particle powders were obtained by spray drying the prepared core-shell structured polymer particles under a condition of 190° C. and 10,000 rpm using a spray dryer (GEA Niro group).

3) Preparation of Rubber Composition 137.5 parts by weight of butadiene rubber (SSBR 3626, LG Chem. Ltd., including 37.5% of treated distillate aromatic extract (TDAE)), 50 parts by weight of the core-shell structured polymer particle powders prepared in Example 1-2), 2.0 parts by weight of stearic acid, 11.2 parts by weight of Z50S (EVONIK DEGUSSA, 50% carbon black/50% bis(3-trimethoxysilylpropyl tetrasulfane), 3.0 parts by weight of zinc oxide, 2.0 parts by weight of polymerized 2,2,4-trimethyl-1,2-dihydroquinoline (Flexsys), 1.0 parts by weight of wax, 1.75 parts by weight of diphenylguanidine (Flexsys) were introduced to a 300 cc Banbury-type Haake mixer (Termo-fisher scientific), the result was stirred at 80 rpm while raising the temperature from 70° C. to 150° C. (taking approximately 6 minutes), and then the result was further stirred for 4 more minutes while maintaining the temperature at 150° C. to obtain a first mixture. The obtained first mixture was sufficiently cooled for 2 hours or longer at room temperature, the cooled first mixture was again introduced to the Banbury-type Haake mixer, and 1.5 parts by weight of sulfur, a cross-linking agent, and 2.0 parts by weight of N-t-butyl-2-benzothiazyl sulfonamide (Flexsys), a cross-linking accelerator, were added thereto, and the result was stirred at 40 rpm for 1 minute and 30 seconds at a temperature of 40° C. to obtain a second mixture.

The prepared second mixture was molded into a sheet having thickness of 4 mm at 50° C. using a 6-inch roll to prepare a rubber specimen.

Example 2

A rubber specimen was prepared in the same manner as in Example 1 except that the butadiene was added in 50% by weight, and the styrene in 30% by weight when preparing the cross-linked styrene-butadiene latex core.

Comparative Example 1

A rubber specimen was prepared in the same manner as in Example 1 except that the core-shell structured polymer particle powders were not added and a silica filler was added in 70 parts by weight when preparing the rubber composition.

Comparative Example 2

A rubber specimen was prepared in the same manner as in Example 1 except that the divinylbenzene was not added, the butadiene was used in 37.5% by weight, and the styrene in 62.5% by weight when preparing the styrene-butadiene latex core.

Comparative Example 3

A rubber specimen was prepared in the same manner as in Example 1 except that the trimethoxysilylpropyl methacrylate was not added, and 40% by weight of the methyl methacrylate was added to 60% by weight of the cross-linked styrene-butadiene polymer latex core when preparing the core-shell structured polymer particles.

Comparative Example 4

A rubber specimen was prepared in the same manner as in Example 1 except that 60% by weight of the methyl methacrylate and 20% by weight of the trimethoxysilylpropyl methacrylate were added to 20% by weight of the cross-linked styrene-butadiene polymer latex core when preparing core-shell structured polymer particles.

Comparative Example 5

A rubber specimen was prepared in the same manner as in Example 1 except that 7.5% by weight of the methyl methacrylate and 2.5% by weight of the trimethoxysilylpropyl methacrylate were added to 90% by weight of the cross-linked styrene-butadiene polymer latex core when preparing core-shell structured polymer particles.

Test Example

In order to comparatively analyze the properties of each rubber specimen prepared in Examples 1 and 2, and Comparative Examples 1 to 5, specific gravity, tensile strength, 300% modulus, tensile elongation, abrasion resistance, a Payne effect ($\Delta G'$) and rolling resistance/wet slip resistance were measured using the following methods. The results are shown in the following Table 1.

1) Specific Gravity

Each specimen prepared in Examples 1 and 2, and Comparative Examples 1 to 5 was prepared into a sample of 2 cm (width)×2 cm (height)×3 mm (thickness), and specific gravity was measured using model AG245 manufactured by METTLER TOLEDO International Inc.

2) Analysis of Tensile Strength (TS), 300% Modulus and Tensile Elongation (TE)

Analysis of tensile strength, 300% modulus and tensile elongation was carried out in accordance with ASTM D638. Each specimen prepared in Examples 1 and 2, and Comparative Examples 1 to 5 was injection molded at 300° C. to prepare each sample of ⅛", and after each of the samples was left unattended for 24 hours at 23° C., both ends of the sample were held to clamps of a tensile tester (INSTRON, 4465 model), and then one of the clamps was fixed, and another of the clamps was pulled at a rate of 500 mm/min to obtain a load value of each of the specimens when elongated by 300% and a load value of each of the specimens when cut, and 300% modulus (kgf/cm$^2$), tensile strength (kgf/cm$^2$) and tensile elongation (%) were obtained through the following Mathematical Formula 1, Mathematical Formula 2 and Mathematical Formula 3, respectively.

$$TensileStrength(kgf/cm^2) = \frac{Load\ When\ Cut\ (Kgf)}{Thickness\ of\ Specimen(cm) \times Width\ of\ Specimen(cm)}$$ [Mathematical Formula 1]

$$300\%\ Modulus(kgf/cm^2) = \frac{Load\ When\ Elongated\ by\ 300\%\ (kgf)}{Thickness\ of\ Specimen(cm) \times Width\ of\ Specimen(cm)}$$ [Mathematical Formula 2]

$$Tensile\ Elongation(\%) = \frac{Height\ of\ Specimen(cm)}{Distance\ between\ Surfaces(cm)} \times 100$$ [Mathematical Formula 3]

3) Abrasion Resistance

Each rubber specimen prepared in Examples 1 and 2, and Comparative Examples 1 to 5 was cross-linked for 20 minutes at 160° C. to prepare each sample, and 500 times of preliminary abrasion of was carried out under a 10 lb load using No. 152 Akron Type Abrasion Tester (Yasuda), and then 3000 times of main abrasion was carried out to measure volume decrements.

4) Payne Effect ($\Delta G'$) and Dynamic Loss Coefficient (Tan δ, Rolling Resistance/Wet Slip Resistance)

In order to analyze a Payne effect and a dynamic loss coefficient (rolling resistance/wet slip resistance), a dynamic viscoelastic test was carried out for each specimen prepared in Examples 1 and 2, and Comparative Examples 1 to 5.

First, each of the specimens was cross-linked for 20 minutes at 160° C. to prepare a specimen for a dynamic viscoelastic test, and the Payne effect was obtained through a strain sweep test in the dynamic viscoelastic test of each of the specimens.

In addition, in order to analyze rolling resistance/wet slip resistance, a dynamic viscoelastic test was carried out to measure a dynamic loss coefficient (tan δ). The dynamic viscoelastic test was carried out using a viscoelastic machine (DMTS 500N, Gabo, Germany) with a frequency of 10 Hz, prestrain of 5% and dynamic strain of 0.5% while raising a temperature by 2° C. per minute from −40° C. to 70° C. Herein, the dynamic loss coefficient at 0° C. is a value representing a degree of wet slip resistance of rubber (brake performance of tire), and the dynamic loss coefficient at 60° C. is a value representing a degree of rolling resistance of rubber (fuel efficiency performance of tire), and as the dynamic loss coefficient at 0° C. increases, wet slip resistance is superior, and as the dynamic loss coefficient at 60° C. decreases, rolling resistance is superior.

In addition, when compared with the rubber of Comparative Example 2 including core-shell structured polymer particles including a non-cross-linked core, the rubber of Examples 1 and 2 according to the present invention exhibited a significantly low Payne effect, and significantly enhanced abrasion resistance and rolling resistance while exhibiting excellent tensile strength and 300% modulus. This was physical property decline of the rubber of Comparative Example 2 since the core was not cross-linked when preparing the core-shell structured polymer particles, and a particle form was not able to be consistently maintained while preparing the rubber, and accordingly, this indicates that cross-linking of the core is an important factor in obtaining target physical properties of rubber (for example, abrasion resistance and rolling resistance).

Furthermore, when compared with the rubber of Comparative Example 3 including core-shell structured polymer particles grafted with a shell having a similar form but not including an alkoxysilane derivative compound, properties of the rubber of Examples 1 and 2 according to the present

TABLE 1

| Category | Example 1 | Example 2 | Comparative Example 1 | Comparative Example 2 | Comparative Example 3 | Comparative Example 4 | Comparative Example 5 |
| --- | --- | --- | --- | --- | --- | --- | --- |
| Specific Gravity (g/cm$^3$) | 0.99 | 0.98 | 1.146 | 0.98 | 0.99 | 1.00 | 0.98 |
| Tensile Strength (kgf/cm$^2$) | 202 | 198 | 232 | 178 | 134 | 212 | 153 |
| Tensile Elongation (%) | 556 | 568 | 657 | 723 | 865 | 476 | 323 |
| 300% Modulus (kgf/cm$^2$) | 78 | 76 | 69 | 36 | 47 | 63 | 45 |
| Abrasion Resistance (cc) | 0.0156 | 0.0164 | 0.0265 | 0.0745 | 0.0453 | 0.0309 | 0.0436 |
| Payne Effect (ΔG', kPa) | 327 | 356 | 612 | 687 | 654 | 487 | 564 |
| Tan δ   0° C. | 0.701 | 0.723 | 0.622 | 0.712 | 0.543 | 0.592 | 0.560 |
|         60° C. | 0.112 | 0.118 | 0.133 | 0.172 | 0.165 | 0.145 | 0.161 |

As shown in Table 1, it was identified that the rubber of Example 1 and Example 2 prepared using the core-shell structured polymer particles grafted with a shell including an alkoxysilane derivative compound according to the present invention has a significantly low Payne effect, a high dynamic loss coefficient at 0° C. and a low dynamic loss coefficient at 60° C. while exhibiting rather excellent specific gravity, tensile strength, tensile elongation and 300% modulus properties compared to the rubber prepared in Comparative Examples 1 to 5.

Specifically, the rubber prepared in Example 1 and Example 2 according to the present invention had rather low tensile strength, tensile elongation and 300% modulus properties compared to the rubber of Comparative Example 1 using silica as a filler instead of the core-shell structured polymer particles, but exhibited high abrasion resistance, a significantly low Payne effect and an excellent dynamic loss coefficient property (exhibiting high value at 0° C. and low value at 60° C.). This indicates that the core-shell structured polymer particles according to the present invention are capable of enhancing abrasion resistance (lifespan property), rolling resistance (fuel efficiency performance) and wet slip resistance (brake performance) while providing similar mechanical properties (tensile strength and the like) compared to the silica used in Comparative Example 1.

invention were all significantly high except for the tensile elongation property. This indicates that, by not including the alkoxysilane derivative compound when forming the shell, the core-shell structured polymer particles and the rubber were not properly interacted, and accordingly, the core-shell structured polymer particles were not able to properly perform a role of a filler, and accordingly, addition of an alkoxysilane derivative compound is an important factor in obtaining target physical properties of rubber (for example, abrasion resistance, rolling resistance and wet slip resistance).

In addition, when compared with the rubber of Comparative Example 4 including core-shell structured polymer particles having the same constitutions as in the present invention, but having a core-shell ratio outside the ratio range proposed in the present invention, and compared with the rubber of Comparative Example 5 including core-shell structured polymer particles having a core-shell ratio and a ratio of shell-forming components outside the ratio range proposed in the present invention, the rubber of Examples 1 and 2 according to the present invention exhibited excellent physical properties (for example, abrasion resistance, wet slip resistance and Payne effect). This indicates that strength of finally produced rubber may decline when a core ratio is too low, and when the core ratio is too high, a ratio of a shell relatively decreases causing reduced interaction with the rubber, and physical properties of the rubber may decline since particles are not dispersed into the finally produced rubber, and accordingly, a proper core-shell ratio is an important factor in obtaining target physical properties of rubber when preparing the core-shell structured polymer particles according to the present invention.

What is claimed is:

1. Core-shell structured polymer particles comprising:
   40% by weight to 80% by weight of a diene-based latex core; and
   20% by weight to 60% by weight of a graft shell including a vinyl compound and an alkoxysilane derivative compound formed on the core,
   wherein the graft shell includes 60% by weight to 90% by weight of the vinyl compound and 10% by weight to 40% by weight of the alkoxysilane derivative compound,
   wherein the vinyl compound is alkyl (meth)acrylate,
   wherein the alkoxysilane derivative compound is one or more selected from the group consisting of trimethoxysilylpropyl methacrylate, trimethoxysilylpropyl acrylate and trimethoxysilylethylstyrene, and
   wherein the diene-based latex core is a polymer derived from a monomer mixture including 25% by weight to 55% by weight of a conjugated diene-based monomer; 25% by weight to 55% by weight of an ethylene unsaturated aromatic monomer; and 10% by weight to 30% by weight of a cross-linking agent.

2. The core-shell structured polymer particles of claim 1, wherein the vinyl compound is methyl methacrylate.

3. The core-shell structured polymer particles of claim 1, wherein the diene-based latex core includes the conjugated diene-based monomer and the ethylene unsaturated aromatic monomer in a weight ratio of 3:7 to 7:3.

4. The core-shell structured polymer particles of claim 3, wherein the conjugated diene-based monomer is one or more selected from the group consisting of 1,3-butadiene, isoprene, chloroprene and piperylene.

5. The core-shell structured polymer particles of claim 3, wherein the ethylene unsaturated aromatic monomer is one or more selected from the group consisting of styrene, α-methylstyrene, isopropylphenyl naphthalene, vinyl naphthalene, $C_{1-3}$ alkyl group-substituted alkylstyrene and halogen-substituted styrene.

6. The core-shell structured polymer particles of claim 1, wherein the conjugated diene-based monomer is one or more selected from the group consisting of 1,3-butadiene, isoprene, chloroprene and piperylene.

7. The core-shell structured polymer particles of claim 1, wherein the ethylene unsaturated aromatic monomer is one or more selected from the group consisting of styrene, α-methylstyrene, isopropylphenyl naphthalene, vinyl naphthalene, $C_{1-3}$ alkyl group-substituted alkylstyrene and halogen-substituted styrene.

8. The core-shell structured polymer particles of claim 1, wherein the cross-linking agent is one or more selected from the group consisting of divinylbenzene, ethylene glycol dimethacrylate, diethylene glycol dimethacrylate, triethylene glycol dimethacrylate, 1,3-butylene glycol dimethacrylate, aryl methacrylate and 1,3-butylene glycol diacrylate.

9. The core-shell structured polymer particles of claim 1, which has an average particle diameter of 30 nm to 100 nm.

10. A rubber composition comprising:
    100 parts by weight of rubber; and
    20 parts by weight to 80 parts by weight of the core-shell structured polymer particles of claim 1 with respect to 100 parts by weight of the rubber.

11. The rubber composition including the core-shell structured polymer of claim 10, wherein the rubber is one or more selected from the group consisting of diene-based rubber, styrene-butadiene-based rubber, natural rubber, isoprene-based rubber, nitrile rubber, urethane-based rubber, butyl-based rubber and a combination thereof.

12. A molded rubber article prepared from the rubber composition of claim 10.

13. The molded rubber article of claim 12, which is a tire.

* * * * *